Patented Jan. 26, 1954

2,667,487

UNITED STATES PATENT OFFICE 2,667,487

CONDENSATION PRODUCTS OF TRIMETHYLHYDROXYETHYL AMMONIUM HYDROXIDE AND DIMETHYLXANTHINE AND PROCESS OF PREPARING SAME

Wolffe Harry Feinstone, Indianapolis, Ind., assignor to Nepera Chemical Co., Inc., Yonkers, N. Y., a corporation of New York No Drawing. Original application April 2, 1952, Serial No. 280,166, now Patent No. 2,661,352, dated December 1, 1953. Divided and this application July 29, 1953, Serial No. 371,184

9 Claims. (Cl. 260—256)

This invention relates to novel therapeutic compounds, and relates more particularly to the novel therapeutic compounds obtained by reacting trimethylhydroxyethyl-ammonium hydroxide, a quaternary ammonium hydroxide compound more generally known as choline, with a dimethylxanthine such as theophylline (1,3-dimethylxanthine), theobromine (3,7 - dimethylxanthine) or paraxanthine (1,7-dimethylxanthine).

The therapeutic importance of the alkaloids theophylline and theobromine is well known. Theophylline and theobromine are weak alkaloids which are only slightly soluble in water and, therefore, not too well adapted for administration. They form soluble double salts and addition salts with a number of compounds. The main object of preparing these double salts has been to increase the solubility of the dimethylxanthines and to reduce the gastric irritation caused by the free alkaloid. These compounds have been employed therapeutically as mixtures of the alkaloid and an organic acid salt though the alkaloids form addition compounds with some bases such as ethylene diamine, dimethanolamine, and the like.

An object of this invention is the preparation of a dimethylxanthine compound of improved aqueous solubility suitable for oral administration and of sufficient stability to overcome any tendency toward gastric irritation as is caused by the free alkaloid itself.

Other objects of this invention will appear from the following detailed description.

I have now found that if trimethylhydroxyethyl-ammonium hydroxide i. e., choline, having the formula

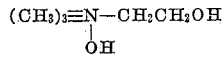

is reacted with a dimethylxanthine, such as theophylline, i. e., 1,3-dimethylxanthine,

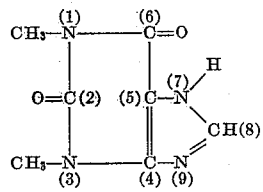

or with theobromine (3,7-dimethylxanthine) or paraxanthine (1,7-dimethylxanthine), a condensation reaction takes place during which one mol of water is split off, yielding novel and valuable compounds.

The condensation of choline and theophylline, for example, takes place to yield a novel compound having what is believed to be the following structure:

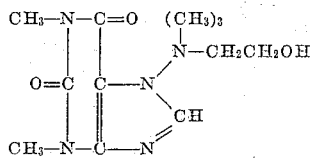

together with a molecule of water. My new compounds are very soluble in water and well adapted for oral and parenteral administration.

Choline, or trimethylhydroxyethyl-ammonium hydroxide, is a compound which is found in many plants and animal organs and the novel compounds of my invention have therapeutic activity depending on their choline content (muscarinic, nicotinic and curariform) as well as upon the alkaloid residue of said compounds.

In general, my novel compounds are obtained by dissolving freshly prepared choline base with theophylline, theobromine or paraxanthine in an anhydrous solvent, refluxing to complete the reaction and crystallizing the product by cooling.

This application is a division of copending application S. No. 280,166 filed on April 2, 1952, now U. S. Patent No. 2,661,352.

The following are examples of preferred procedures for carrying out my invention and are given by way of illustration and not by limitation.

Example I 418.8 grams of choline chloride (3 mols) were dissolved in 360 ml. of warm methanol and added to a solution of 198 grams of potassium hydroxide (85%) in 480 ml. of methanol. The formed potassium chloride precipitated out and was collected on a filter. The filter cake was washed with 600 ml. of isopropanol. The filtrate containing the choline base (trimethylhydroxyethyl-ammonium hydroxide) was poured into a boiling suspension of 540 grams (3 mols) of theophylline (1,3-dimethylxanthine) in 4 liters of isopropanol. The reaction mixture was then refluxed for half an hour, all the reactants were dissolved, and then the reaction mixture was cooled and allowed to stand until the precipitation was complete. The precipitate was collected on a Buchner filter, washed with 150 ml. of isopropanol and dried at 110° C. For purification, it was recrystallized from isopropanol. The yield was 767 grams, or 85% of the theory. The condensation product of choline and theophylline, $C_{12}H_{21}O_3N_5$, forms small white prisms when crystallized out of isopropanol. Its melting point is 186.5–187° C. In elementary analysis, there was found N=24.6%; C=51.3%; H=7.53%; (theory N=24.8%; C=51.0%; H=7.47%).

The new compound is very soluble in water, slightly soluble in alcohol or chloroform, and insoluble in benzene, acetone, ether and ligroin. It is insoluble in alkalies and decomposes in acids.

This novel compound of my invention is a valuable therapeutic agent as it is much more soluble in water than theophylline and the pH of its aqueous solutions are much nearer neutral than that of theophylline, as shown by the following:

|  | Solubility at Room Temperature | pH of 0.8% Aqueous Solution |
|---|---|---|
| Theophylline | 1:120 | 4.8 |
| Choline-theophylline | 1:1 | 9.7 |

The foregoing table shows that the solubility of choline-theophylline is about 100 times that of theophylline. The pH is on the alkaline side and may be buffered to pH 7.0 quite readily with the usual buffer salts.

*Example II*

Choline base was prepared from 8.74 grams (0.0625 mol) of choline chloride, as in the previous example. To the filtrate containing said base 11.28 grams (0.0625 mol) of theobromine (3,7-dimethylxanthine) was added and the reaction mixture was heated on a steam bath for half an hour. The reaction mixture was allowed to stand for 2 additional hours at room temperature, and then filtered. The filtrate was concentrated on a steam bath until crystallization began to take place and then cooled on ice. The collected product was recrystallized from 50 ml. isopropanol, washed with isopropanol and dried in a vacuum. The condensation product of choline and theobromine, $C_{12}H_{21}O_3N_5$, forms small white prisms which melt at 178.5–179.5° C. The yield obtained was 10.7 grams, or 61% of theory. In a nitrogen analysis (Micro-Dumas) there was found N=24.2%, (theory 24.7%).

The new compound is very soluble in water, slightly soluble in alcohol and chloroform, and insoluble in ether, acetone, benzene and ligroin. It is insoluble in alkalies and decomposes in acids. This compound also has enhanced solubility and pH relationships.

It is understood that the foregoing detailed description is given merely by way of illustration and that many variations may be made therein without departing from the spirit of my invention.

Having described my invention, what I desire to secure by Letters Patent is:

1. Compounds having the general formula

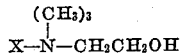

wherein X is a dimethylxanthine radical, the 8-position being unsubstituted.

2. The condensation product of trimethylhydroxyethyl-ammonium hydroxide and 1,3-dimethylxanthine having the formula

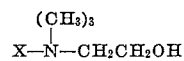

wherein X is a 1,3-dimethylxanthine radical.

3. The condensation product of trimethylhydroxyethyl-ammonium hydroxide and 3,7-dimethylxanthine having the formula

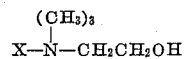

wherein X is a 3,7-dimethylxanthine radical.

4. The process of producing new therapeutic agents, which comprises reacting choline base (trimethylhydroxyethyl-ammonium hydroxide) with a dimethylxanthine in a non-aqueous solvent under reflux, cooling the reaction mixture, and separating a choline-dimethylxanthine condensation product therefrom.

5. The process of producing new therapeutic agents, which comprises reacting choline base (trimethylhydroxyethyl-ammonium hydroxide) with theophylline in a non-aqueous solvent under reflux, cooling the reaction mixture, and separating a choline-theophylline condensation product therefrom.

6. The process for producing a new therapeutic agent, which comprises adding a solution of choline chloride in a non-aqueous solvent to a solution of an alkali metal hydroxide in a non-aqueous solvent, filtering off any precipitate, adding the filtrate to a hot suspension of theophylline in a non-aqueous solvent, heating the mixture, cooling, and separating a choline-theophylline condensation product therefrom.

7. The process for producing a new therapeutic agent, which comprises adding a solution of choline chloride in methanol to a solution of potassium hydroxide in methanol, filtering off any precipitate, adding the filtrate to a hot suspension of theophylline in isopropanol, heating the mixture, cooling, and separating a choline-theophylline condensation product therefrom.

8. The process for producing a new therapeutic agent, which comprises adding a solution of choline chloride in a non-aqueous solvent to a solution of an alkali metal hydroxide in a non-aqueous solvent, filtering off any precipitate, adding the filtrate to a hot suspension of theobromine in a non-aqueous solvent, heating the mixture, cooling and separating a choline-theobromine condensation product therefrom.

9. The process for producing a new therapeutic agent, which comprises adding a solution of choline chloride in methanol to a solution of potassium hydroxide in methanol, filtering off any precipitate, adding the filtrate to a hot suspension of theobromine in isopropanol, heating the mixture, cooling, and separating a choline-theobromine condensation product therefrom.

WOLFFE HARRY FEINSTONE.

No references cited